United States Patent [19]

Miyamae

[11] 4,208,918
[45] Jun. 24, 1980

[54] DIGITAL PRESSURE SENSOR

[75] Inventor: Ryuichi Miyamae, Yamatokoriyama, Japan

[73] Assignee: Sharp Kabushiki Kaisha, Osaka, Japan

[21] Appl. No.: 946,089

[22] Filed: Sep. 26, 1978

[30] Foreign Application Priority Data

Sep. 28, 1977 [JP] Japan .................. 52-131065

[51] Int. Cl.$^2$ ............................. G01L 19/04
[52] U.S. Cl. ......................... 73/708; 73/728
[58] Field of Search ............. 73/708, 722, 728, 702, 73/753; 331/65, 66; 336/30; 324/98

[56] References Cited

U.S. PATENT DOCUMENTS

| 2,641,706 | 6/1953 | Dickinson | 324/98 |
| 3,355,949 | 12/1967 | Elwood et al. | 331/65 |

Primary Examiner—Donald O. Woodiel
Attorney, Agent, or Firm—Birch, Stewart, Kolasch & Birch

[57] ABSTRACT

A first oscillator is associated with a pressure detector so that frequency of an output signal of the first oscillator varies in response to variations of the detected pressure. A second oscillator having a same construction as the first oscillator is provided for determining a sampling period of the output signal of the first oscillator, thereby compensating for variations of the frequency of the output signal derived from the first oscillator due to variations of temperature, humidity, a power supply voltage, etc.

9 Claims, 2 Drawing Figures

DIGITAL PRESSURE SENSOR

BACKGROUND AND SUMMARY OF THE INVENTION

The present invention relates to a pressure sensor and, more particularly, to a digital pressure sensor which can compensate for variations of temperature, humidity, a power supply voltage, etc.

A digital pressure sensor is developed, which develops a signal of which frequency varies in response to variations of a detected pressure. Such a digital pressure sensor is applicable to a sphygmomanometer including a digital display. In the conventional digital pressure sensor, the output frequency varies, without regard to the variation of the detected pressure, when temperature, humidity or a power supply voltage varies. This will preclude an accurate detection of the blood pressure.

Accordingly, an object of the present invention is to provide a digital pressure sensor which can compensate for variations of temperature, humidity, a power supply voltage, etc.

Another object of the present invention is to provide a pressure sensor suited for a sphygmomanometer including a digital display.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a first oscillator develops a first signal of which frequency represents a detected pressure. A second oscillator of the same construction as the first oscillator develops a reference frequency signal, which functions to gate the first signal for a predetermined period of time. Since the first and second oscillators have the same constructions, the pressure sensor of the present invention can compensate for variations of temperature, humidity and a power supply voltage.

More specifically, the reference frequency signal derived from the second oscillator is applied to a frequency divider which develops a gate signal to be applied to one input terminal of an AND gate, of which the other input terminal is connected to receive the first signal derived from the first oscillator. An output signal of the AND gate is applied to a counter for detecting the pressure.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
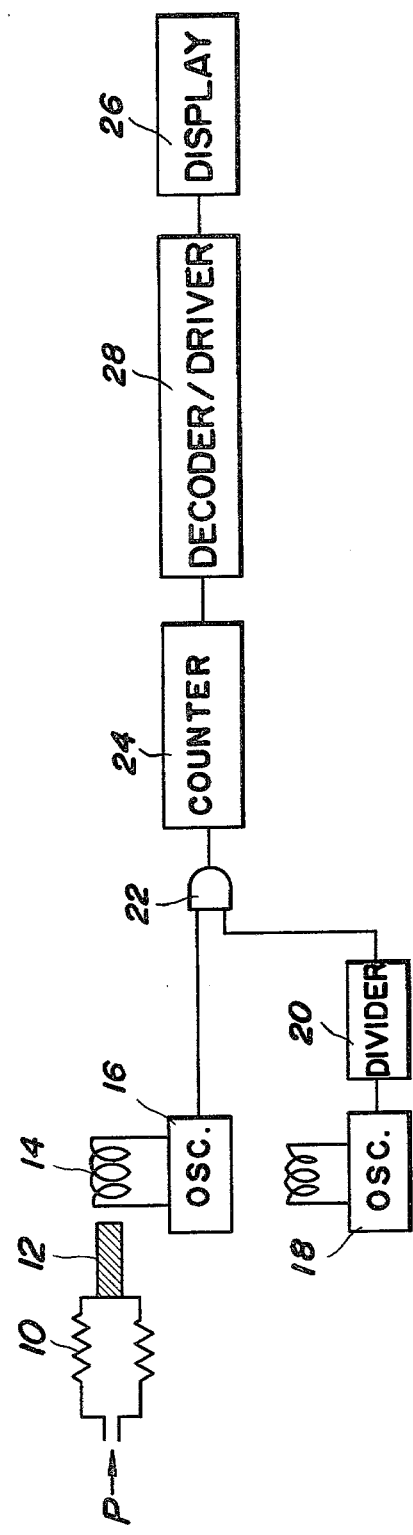
FIG. 1 is a schematic block diagram of an embodiment of a pressure sensor of the present invention.

FIG. 1 shows an embodiment of a pressure sensor of the present invention. A bellows 10 is responsive to a pressure P to be detected. A core 12 is fixed to the bellows 10 so that the core 12 is inserted into a coil 14 when the detected pressure increases. The coil 14 is associated with an oscillator 16 so that the oscillator 16 develops a detection signal of which frequency varies in response to the detected pressure P.

Another oscillator 18 having a same construction as the oscillator 16 is provided for developing a reference frequency signal. The reference frequency signal derived from the oscillator 18 is applied to a frequency divider 20. An AND gate 22 is connected to receive output signals of the oscillator 16 and the frequency divider 20, respectively, and an output signal of the AND gate 22 is applied to a counter 24 to count the pulses derived from the oscillator 16 for a period of time determined by the frequency divider 20. The contents stored in the counter 24 is displayed on a digital display 26 through a decoder/driver circuit 28.

Since the location of the core 12 is dependent on the pressure P, the inductance of the coil 14 varies in response to the pressure P. That is, the frequency of the output signal of the oscillator 16 represents the detected pressure P. However, the frequency of the output signal of the oscillator 16 varies when temperature, humidity or a power supply voltage varies.

Now assume that the output frequency of the oscillator 16 increases due to variations of the temperature, humidity, power supply voltage, etc., without regard to the variations of the pressure P, the frequency of the reference frequency signal derived from the oscillator 18 also increases because the oscillators 16 and 18 have the same construction. Therefore, the pulsewidth of the gate control signal derived from the frequency divider 20 is shortened in order to compensate for the variations of the output frequency of the oscillator 16.

Contrarily, when the output frequency of the oscillator 16 decreases without regard to the variation of the pressure P, the frequency of the reference frequency signal derived from the oscillator 18 also decreases. Therefore, the pulsewidth of the gate control signal derived from the frequency divider 20 is lengthened to compensate for the variations of the output frequency of the oscillator 16.

Figure 2:
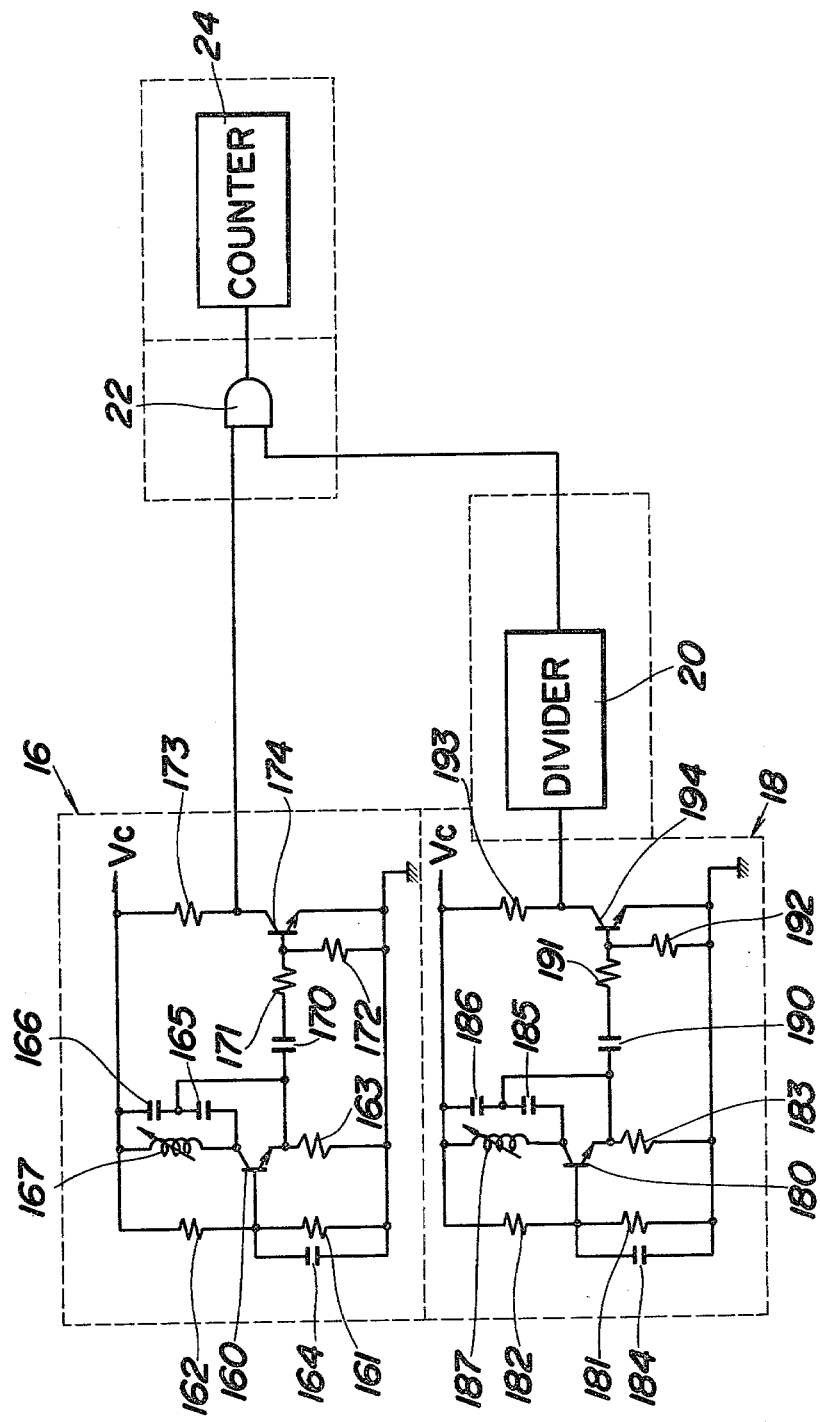
FIG. 2 is a circuit diagram of an embodiment of an oscillator included within the pressure sensor of FIG. 1.

FIG. 2 shows constructions of the oscillators 16 and 18. Like elements corresponding to those of FIG. 1 are indicated by like numerals.

The oscillator 16 mainly comprises a Colpitts oscillator including a transistor 160, resistors 161, 162 and 163, capacitors 164, 165 and 166 and a variable inductance 167. The inductance value of the variable inductance 167 varies in response to the location of the core 12 (see FIG. 1). The resistors 161, 162 and 163 function, in combination, to supply a predetermined bias voltage to the base electrode of the transistor 160. The capacitor 164 functions as a bypass route of an alternating current.

The output frequency f of the above constructed Colpitts oscillator is determined as follows:

$$f = 1/2\pi\sqrt{LC}$$

where:
   L is the inductance value of the variable inductance 167; and $$C = C_1 C_2 / (C_1 + C_2)$$

where: $C_1$ is the capacitance value of the capacitor 165; and $C_2$ is the capacitance value of the capacitor 166.

When the pressure P (see FIG. 1) increases, the inductance value L increases and, hence, the output frequency f of the oscillator decreases.

The oscillator 16 further comprises a waveform shapener including a capacitor 170, resistors 171, 172 and 173, and a transistor 174. The waveform shapener functions to convert the sinusoidal output signal of the Colpitts oscillator to a rectangular signal suited for the counter 24.

The oscillator 18 has the same construction as the oscillator 16. That is, the oscillator 18 comprises the Colpitts oscillator including a transistor 180, resistors 181, 182 and 183, capacitors 184, 185 and 186, a variable inductance 187, and the waveform shapener including a capacitor 190, resistors 191, 192 and 193, and a transistor 194. The inductance value of the variable inductance 187 is set at a desired value.

The invention being thus described, it will be obvious that the same may be varied in many ways. Such variations are not to be regarded as a departure from the spirit and scope of the invention, and all such modifications are intended to be included within the scope of the following claims.

What is claimed is:
1. A digital pressure sensor comprising:
   a first oscillator means for developing a first output signal;
   frequency variation means for varying the frequency of said first output signal in response to variation of a detected pressure;
   second oscillator means for developing a second output signal;
   said first and second oscillator means being subjected to changes in temperature, humidity, and power supply voltage thereby causing the frequency of said first and second output signals to vary in response thereto;
   said second oscillator means having a similar construction relative to said first oscillator means, said similar construction of said second oscillator means relative to said first oscillator means cancelling the variations in frequency of said output signals from said first and second oscillator means due to variations in said temperature, humidity, and power supply voltage; and
   gate means responsive to said second output signal for determining a sampling period of said first output signal.

2. The digital pressure sensor of claim 1 wherein said first and second oscillators comprise a Colpitts oscillator and a waveform shapener, respectfully.

3. The digital pressure sensor of claim 1 wherein said gate means comprises:
   a frequency divider means for dividing said second output signal; and
   AND gate means connected to receive said first output signal and an output signal from said frequency divider.

4. A digital pressure sensor comprising:
   a first oscillator for developing a first output signal;
   frequency variation means for varying the frequency of said first output signal in response to variation of a detected pressure;
   a second oscillator for developing a second output signal, said second oscillator means having a similar construction as said first oscillator;
   gate means responsive to said second output signal for determining a sampling period of said first output signal; and
   driver means for applying an output signal of said gate means to a display device for displaying the detected pressure.

5. The digital pressure sensor of claim 4, wherein said display device comprises a digital display device, and said driver means include a counter for receiving said output signal of said gate means and a decoder/driver for activating said digital display device in accordance with contents stored in said counter.

6. The digital pressure sensor of claim 4 or 5, wherein said first and second oscillators comprise a Colpitts oscillator and a waveform shapener, respectively.

7. The digital pressure sensor of claim 4, wherein said frequency variation means include an inductance means for varying the frequency of an output signal of said Colpitts oscillator.

8. The digital pressure sensor of claim 4 or 5, wherein said gate means comprise:
   a frequency divider for dividing said second output signal; and
   an AND gate connected to receive said first output signal and an output signal of said frequency divider.

9. The digital pressure sensor of claim 5, wherein said gate means comprise:
   a frequency divider for dividing said second output signal; and
   an AND gate connected to receive said first output signal and an output signal of said frequency divider, and wherein
   an output signal of said AND gate is applied to said counter.

* * * * *